(12) United States Patent
Ling et al.

(10) Patent No.: US 7,411,929 B2
(45) Date of Patent: * Aug. 12, 2008

(54) METHOD AND APPARATUS FOR UTILIZING CHANNEL STATE INFORMATION IN A WIRELESS COMMUNICATION SYSTEM

(75) Inventors: Fuyun Ling, San Diego, CA (US); Jay R. Walton, Westford, MA (US); Steven J. Howard, Ashland, MA (US); Mark Wallace, Bedford, MA (US); John W. Ketchum, Harvard, MA (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

This patent is subject to a terminal disclaimer.

(21) Appl. No.: 10/903,066

(22) Filed: Jul. 30, 2004

(65) Prior Publication Data

US 2005/0002326 A1    Jan. 6, 2005

Related U.S. Application Data

(63) Continuation of application No. 09/816,481, filed on Mar. 23, 2001, now Pat. No. 6,771,706.

(51) Int. Cl.
*H04L 27/00* (2006.01)
(52) U.S. Cl. ........................................ 370/334; 375/299
(58) Field of Classification Search ........................ None
See application file for complete search history.

(56) References Cited

U.S. PATENT DOCUMENTS 5,065,109 A    11/1991   Gihousen et al.
5,265,119 A    11/1993   Gilhousen et al.

(Continued)

FOREIGN PATENT DOCUMENTS

EP    0951091 A2    10/1999

(Continued)

OTHER PUBLICATIONS

Babak Hassibi et al., "High-Rate Codes that are Linear in Space and Time," Lucent Technologies, New Jersey, Aug. 22, 2000, (pp. 1-55).

(Continued)

*Primary Examiner*—Chau T. Nguyen
*Assistant Examiner*—Sori A Aga
(74) *Attorney, Agent, or Firm*—Kent Douglas Baker; Ross L. Franks; Thomas Rouse

(57) ABSTRACT

Techniques for transmitting data from a transmitter unit to a receiver unit in a multiple-input multiple-output (MIMO) communication system. In one method, at the receiver unit, a number of signals are received via a number of receive antennas, with the received signal from each receive antenna comprising a combination of one or more signals transmitted from the transmitter unit. The received signals are processed to derive channel state information (CSI) indicative of characteristics of a number of transmission channels used for data transmission. The CSI is transmitted back to the transmitter unit. At the transmitter unit, the CSI from the receiver unit is received and data for transmission to the receiver unit is processed based on the received CSI.

13 Claims, 8 Drawing Sheets

U.S. PATENT DOCUMENTS

| | | | |
|---|---|---|---|
| 5,471,647 | A | 11/1995 | Gerlach et al. |
| 5,799,005 | A | 8/1998 | Soliman |
| 5,844,922 | A * | 12/1998 | Wolf et al. .................. 714/786 |
| 5,903,554 | A | 5/1999 | Saints |
| 5,940,439 | A | 8/1999 | Kleider et al. |
| 5,960,399 | A | 9/1999 | Barclay et al. |
| 5,973,642 | A | 10/1999 | Li et al. |
| 6,097,972 | A | 8/2000 | Saints et al. |
| 6,108,374 | A | 8/2000 | Balachandran et al. |
| 6,131,016 | A | 10/2000 | Greenstein et al. |
| 6,141,567 | A | 10/2000 | Youssefmir et al. |
| 6,144,711 | A | 11/2000 | Raleigh et al. |
| 6,154,489 | A | 11/2000 | Kleider et al. |
| 6,304,594 | B1 | 10/2001 | Salinger |
| 6,452,964 | B1 | 9/2002 | Yoshida |
| 6,473,467 | B1 | 10/2002 | Wallace et al. |
| 6,771,706 | B2 | 8/2004 | Ling et al. |
| 2002/0122383 | A1* | 9/2002 | Wu et al. .................... 370/210 |
| 2004/0141548 | A1* | 7/2004 | Shattil ........................ 375/146 |

FOREIGN PATENT DOCUMENTS

| | | |
|---|---|---|
| GB | 2355834 | 5/2001 |
| JP | 1-44057 | 7/1985 |
| JP | 8-4162 | 3/1996 |
| WO | 9622662 | 7/1996 |
| WO | 98/09381 * | 3/1998 |
| WO | 9809381 | 3/1998 |
| WO | 9830047 | 7/1998 |
| WO | 0042600 | 7/2000 |
| WO | 0058942 | 10/2000 |
| WO | 0171928 | 9/2001 |
| WO | 0278211 | 3/2002 |
| WO | WO02078211 | 10/2002 |

OTHER PUBLICATIONS

Baum et al., "A Comparison of Differential and Coherent Reception for a Coded OFDM System in a Low C/I Environment," Global Telecommunications Conference, Golbalcom 1997, pp. 300-304.

John A.C. Bingham, "Multicarrier Modulation for Data Transmission: An Idea Whose Time Has Come," IEEE Communications Magazine, May 1990 (pp. 5-13).

Jongren et al., "Utilizing Quantized Feedback Information in Orthogonal Space-Time Block Coding," 2000 IEEE Global Telecommunications Conference, 2(4): 995-999, Nov. 27, 2000.

Kuhn, Gary "Joint Optimization of Classifier and Future Space in Speech Recognition" Proceedings of the Int'l Joint Conf. On Neural Networks 3: 709-714 (1992).

Paliwal, K.K. "Dimensionality Reduction of the Enhanced Feature Set for the HMM-Based Speech Recognizer" Digital Signal Processing 2: 157-173 (1992).

U.S. Appl. No. 09/532,492, filed Mar. 22, 2000, entitled "High Efficiency, High Performance Communications System Employing Multi-Carrier Modulation," Ahmad Jalali, et al., QUALCOMM Inc., California (USA).

U.S. Appl. No. 09/776,073, filed Feb. 1, 2001, entitled "Coding Scheme For A Wireless Communication System," Ivan J. Fernandez Corbaton, et al., QUALCOMM Inc., California (USA).

F. Ling, "Optimal Reception, Performance Bound, and Cutoff-Rate Analysis of References-Assisted Coherent CDMA Communications and Applications," IEEE Transactions on Communication, Oct. 1999.

P.W. Wolniansky, et al., "V-Blast: An Architecture for Achieving Very High Data Rates over the Rich-Scattering Wireless Channel," Proc. ISSSE-98, Pisa, Italy.

M. Naijoh, S. Sampei, N. Morinaga, and Y. Kamio, "Type-II Hybrid ARQ Scheme using Puntured Convolutional Code with Adaptive Modulation System," Technical Report of IEICE, Japan, May 21, 1996, vol. 96(49), pp. 19-24, TIEICE.

C.M. Degen, C.M. Walke, A. Lecomte, and B. Rembold, "Adaptive MIMO Techniques for the UTRA-TDD Mode," Vehicular Technology Conference 2001, VTC Spring 2001, IEEE VTS 53rd, USA, Mar. 9, 2001, vol. 1, pp. 108-112.

Nokia, "METRA Project Results: Link-Level Simulation Results for Standard-Friendly MIMO Techniques in the TDD Mode of UTRA," 3GPP TSG RAN WG1, TSGR1#19, R1-01-0259, Las Vegas, USA, Feb. 23, 2001.

Y. Inoue, M. Okada, and S. Komaki, "A New Space Division Multiplexing for OFDM Signals," Proceedings of the 1998 IEICE General Conference, No. 1, Japan, Mar. 6, 1998, p. 378, 98-Spring-Report1-B-5-14.

* cited by examiner

METHOD AND APPARATUS FOR UTILIZING CHANNEL STATE INFORMATION IN A WIRELESS COMMUNICATION SYSTEM

CLAIM OF PRIORITY UNDER 35 U.S.C. §120

The present Application for Patent is a Continuation and claims priority to patent application Ser. No. 09/816,481 entitled "Method and Apparatus for Utilizing Channel State Information in a Wireless Communication System" filed Mar. 23, 2001, now U.S. Pat. No. 6,771,706, and assigned to the assignee hereof and hereby expressly incorporated by reference herein.

BACKGROUND

1. Field

The present invention relates generally to data communication, and more specifically to a novel and improved method and apparatus for utilizing (full or partial) channel state information to provide improved performance for a wireless communication system.

2. Background

Wireless communication systems are widely deployed to provide various types of communication such as voice, data, and so on. These systems may be based on code division multiple access (CDMA), time division multiple access (TDMA), orthogonal frequency division modulation (OFDM), or some other modulation techniques. OFDM systems can provide high performance for some channel environments.

In a terrestrial communication system (e.g., a cellular system, a broadcast system, a multi-channel multi-point distribution system (MMDS), and others), an RF modulated signal from a transmitter unit may reach a receiver unit via a number of transmission paths. The characteristics of the transmission paths typically vary over time due to a number of factors such as fading and multipath.

To provide diversity against deleterious path effects and improve performance, multiple transmit and receive antennas may be used. If the transmission paths between the transmit and receive antennas are linearly independent (i.e., a transmission on one path is not formed as a linear combination of the transmissions on other paths), which is generally true to some extent, then the likelihood of correctly receiving a transmitted signal increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmission. A MIMO channel may be decomposed into $N_C$ independent channels, with $N_C \leq \min\{N_T, N_R\}$. Each of the $N_C$ independent channels is also referred to as a spatial subchannel of the MIMO channel and corresponds to a dimension. The MIMO system can provide improved performance if the additional dimensionalities created by the multiple transmit and receive antennas are utilized.

There is therefore a need in the art for techniques to utilize channel state information (CSI) to take advantage of the additional dimensionalities created by a MIMO system to provide improved system performance.

SUMMARY

Aspects of the invention provide techniques to process received signals in a multiple-input multiple-output (MIMO) communication system to recover transmitted signals, and to estimate the characteristics of a MIMO channel. Various receiver processing schemes may be used to derive channel state information (CSI) indicative of the characteristics of the transmission channels used for data transmission. The CSI is then reported back to the transmitter system and used to adjust the signal processing (e.g., coding, modulation, and so on). In this manner, high performance is achieved based on the determined channel conditions.

A specific embodiment of the invention provides a method for transmitting data from a transmitter unit to a receiver unit in a MIMO communication system. In accordance with the method, at the receiver unit, a number of signals are received via a number of receive antennas, with the received signal from each receive antenna comprising a combination of one or more signals transmitted from the transmitter unit. The received signals are processed (e.g., via a channel correlation matrix inversion (CCMI) scheme, an unbiased minimum mean square error (UMMSE) scheme, or some other receiver processing scheme) to derive CSI indicative of characteristics of a number of transmission channels used for data transmission. The CSI is encoded and transmitted back to the transmitter unit. At the transmitter unit, the CSI from the receiver unit is received and data for transmission to the receiver unit is processed based on the received CSI.

The reported CSI may include full CSI or partial CSI. Full CSI includes sufficient full-bandwidth characterization (e.g., the amplitude and phase across the useable bandwidth) of the propagation path between all pairs of transmit and receive antennas. Partial CSI may include, for example, the signal-to-noise-plus-interference (SNR) of the transmission channels. At the transmitter unit, the data for each transmission channel may be coded based on the SNR estimate for the transmission channel, and the coded data for each transmission channel may be modulated in accordance with a modulation scheme selected based on the SNR estimate. For full-CSI processing, the modulation symbols are also pre-processed prior to transmission in accordance with the received CSI.

The invention further provides methods, systems, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
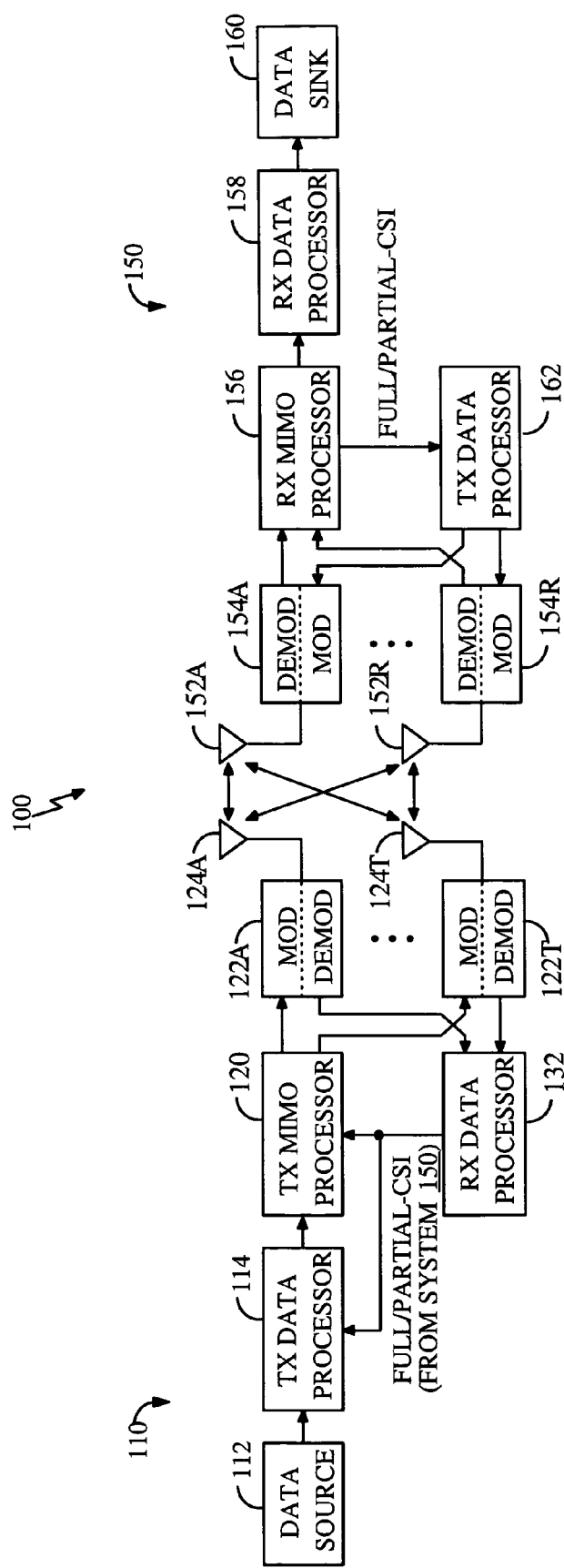
FIG. 1 is a diagram of a multiple-input multiple-output (MIMO) communication system capable of implementing various aspects and embodiments of the invention.

FIG. 1 is a diagram of a multiple-input multiple-output (MIMO) communication system 100 capable of implementing various aspects and embodiments of the invention. System 100 includes a first system 110 in communication with a second system 150. System 100 can be operated to employ a combination of antenna, frequency, and temporal diversity (described below) to increase spectral efficiency, improve performance, and enhance flexibility. In an aspect, system 150 can be operated to determine the characteristics of the communication link and to report channel state information (CSI) back to system 110, and system 110 can be operated to adjust the processing (e.g., encoding and modulation) of data to be transmitted based on the reported CSI.

Within system 110, a data source 112 provides data (i.e., information bits) to a transmit (TX) data processor 114, which encodes the data in accordance with a particular encoding scheme, interleaves (i.e., reorders) the encoded data based on a particular interleaving scheme, and maps the interleaved bits into modulation symbols for one or more transmission channels used for transmitting the data. The encoding increases the reliability of the data transmission. The interleaving provides time diversity for the coded bits, permits the data to be transmitted based on an average signal-to-noise-plus-interference (SNR) for the transmission channels used for the data transmission, combats fading, and further removes correlation between coded bits used to form each modulation symbol. The interleaving may further provide frequency diversity if the coded bits are transmitted over multiple frequency subchannels. In accordance with an aspect of the invention, the encoding, interleaving, and symbol mapping (or a combination thereof) are performed based on the full or partial CSI available to system 110, as indicated in FIG. 1.

The encoding, interleaving, and symbol mapping at transmitter system 110 can be performed based on numerous schemes. One specific scheme is described in U.S. patent application Ser. No. 09/776,073, entitled "CODING SCHEME FOR A WIRELESS COMMUNICATION SYSTEM," filed Feb. 1, 2001, assigned to the assignee of the present application and incorporated herein by reference.

MIMO system 100 employs multiple antennas at both the transmit and receive ends of the communication link. These transmit and receive antennas may be used to provide various forms of spatial diversity, including transmit diversity and receive diversity. Spatial diversity is characterized by the use of multiple transmit antennas and one or more receive antennas. Transmit diversity is characterized by the transmission of data over multiple transmit antennas. Typically, additional processing is performed on the data transmitted from the transmit antennas to achieved the desired diversity. For example, the data transmitted from different transmit antennas may be delayed or reordered in time, coded and interleaved across the available transmit antennas, and so on. Receive diversity is characterized by the reception of the transmitted signals on multiple receive antennas, and diversity is achieved by simply receiving the signals via different signal paths.

System 100 may be operated in a number of different communication modes, with each communication mode employing antenna, frequency, or temporal diversity, or a combination thereof. The communication modes may include, for example, a "diversity" communication mode and a "MIMO" communication mode. The diversity communication mode employs diversity to improve the reliability of the communication link. In a common application of the diversity communication mode, which is also referred to as a "pure" diversity communication mode, data is transmitted from all available transmit antennas to a recipient receiver system. The pure diversity communications mode may be used in instances where the data rate requirements are low or when the SNR is low, or when both are true. The MIMO communication mode employs antenna diversity at both ends of the communication link (i.e., multiple transmit antennas and multiple receive antennas) and is generally used to both improve the reliability and increase the capacity of the communications link. The MIMO communication mode may further employ frequency and/or temporal diversity in combination with the antenna diversity.

System 100 may further utilize orthogonal frequency division modulation (OFDM), which effectively partitions the operating frequency band into a number of (L) frequency subchannels (i.e., frequency bins). At each time slot (i.e., a particular time interval that may be dependent on the bandwidth of the frequency subchannel), a modulation symbol may be transmitted on each of the L frequency subchannels.

System 100 may be operated to transmit data via a number of transmission channels. As noted above, a MIMO channel may be decomposed into $N_c$ independent channels, with $N_C \leq \min \{N_T, N_R\}$. Each of the $N_c$ independent channels is also referred to as a spatial subchannel of the MIMO channel. For a MIMO system not utilizing OFDM, there may be only one frequency subchannel and each spatial subchannel may be referred to as a "transmission channel". For a MIMO system utilizing OFDM, each spatial subchannel of each frequency subchannel may be referred to as a transmission channel. And for an OFDM system not operated in the MIMO communication mode, there is only one spatial subchannel and each frequency subchannel may be referred to as a transmission channel.

A MIMO system can provide improved performance if the additional dimensionalities created by the multiple transmit and receive antennas are utilized. While this does not necessarily require knowledge of CSI at the transmitter, increased system efficiency and performance are possible when the transmitter is equipped with CSI, which is descriptive of the transmission characteristics from the transmit antennas to the receive antennas. CSI may be categorized as either "full CSI" or "partial CSI".

Full CSI includes sufficient characterization (e.g., the amplitude and phase) across the entire system bandwidth (i.e., each frequency subchannel) for the propagation path between each transmit-receive antenna pair in the $N_T \times N_R$ MIMO matrix. Full-CSI processing implies that (1) the channel characterization is available at both the transmitter and receiver, (2) the transmitter computes eigenmodes for the MIMO channel (described below), determines modulation symbols to be transmitted on the eigenmodes, linearly preconditions (filters) the modulation symbols, and transmits the preconditioned modulation symbols, and (3) the receiver performs a complementary processing (e.g., spatial matched filter) of the linear transmit processing based on the channel characterization to compute the $N_c$ spatial matched filter coefficients needed for each transmission channel (i.e., each eigenmode). Full-CSI processing further entails processing the data (e.g., selecting the proper coding and modulation schemes) for each transmission channel based on the channel's eigenvalue (described below) to derive the modulation symbols.

Partial CSI may include, for example, the signal-to-noise-plus-interference (SNR) of the transmission channels (i.e., the SNR for each spatial subchannel for a MIMO system without OFDM, or the SNR for each frequency subchannel of each spatial subchannel for a MIMO system with OFDM). Partial-CSI processing may imply processing the data (e.g., selecting the proper coding and modulation schemes) for each transmission channel based on the channel's SNR.

Referring to FIG. 1, a TX MIMO processor 120 receives and processes the modulation symbols from TX data processor 114 to provide symbols suitable for transmission over the MIMO channel. The processing performed by TX MIMO processor 120 is dependent on whether full or partial CSI processing is employed, and is described in further detail below.

For full-CSI processing, TX MIMO processor 120 may demultiplex and precondition the modulation symbols. And for partial-CSI processing, TX MIMO processor 120 may simply demultiplex the modulation symbols. The full and partial-CSI MIMO processing is described in further detail below. For a MIMO system employing full-CSI processing but not OFDM, TX MIMO processor 120 provides a stream of preconditioned modulation symbols for each transmit antenna, one preconditioned modulation symbol per time slot. Each preconditioned modulation symbol is a linear (and weighted) combination of $N_C$ modulation symbols at a given time slot for the $N_C$ spatial subchannels, as described in further detail below. For a MIMO system employing full-CSI processing and OFDM, TX MIMO processor 120 provides a stream of preconditioned modulation symbol vectors for each transmit antenna, with each vector including L preconditioned modulation symbols for the L frequency subchannels for a given time slot. For a MIMO system employing partial-CSI processing but not OFDM, TX MIMO processor 120 provides a stream of modulation symbols for each transmit antenna, one modulation symbol per time slot. And for a MIMO system employing partial-CSI processing and OFDM, TX MIMO processor 120 provides a stream of modulation symbol vectors for each transmit antenna, with each vector including L modulation symbols for the L frequency subchannels for a given time slot. For all cases described above, each stream of (either unconditioned or preconditioned) modulation symbols or modulation symbol vectors is received and modulated by a respective modulator (MOD) 122, and transmitted via an associated antenna 124.

In the embodiment shown in FIG. 1, receiver system 150 includes a number of receive antennas 152 that receive the transmitted signals and provide the received signals to respective demodulators (DEMOD) 154. Each demodulator 154 performs processing complementary to that performed at modulator 122. The demodulated symbols from all demodulators 154 are provided to a receive (RX) MIMO processor 156 and processed in a manner described below. The received modulation symbols for the transmission channels are then provided to a RX data processor 158, which performs processing complementary to that performed by TX data processor 114. In a specific design, RX data processor 158 provides bit values indicative of the received modulation symbols, deinterleaves the bit values, and decodes the deinterleaved values to generate decoded bits, which are then provided to a data sink 160. The received symbol de-mapping, deinterleaving, and decoding are complementary to the symbol mapping, interleaving, and encoding performed at transmitter system 110. The processing by receiver system 150 is described in further detail below.

The spatial subchannels of a MIMO system (or more generally, the transmission channels in a MIMO system with or without OFDM) typically experience different link conditions (e.g., different fading and multipath effects) and may achieve different SNR. Consequently, the capacity of the transmission channels may be different from channel to channel. This capacity may be quantified by the information bit rate (i.e., the number of information bits per modulation symbol) that may be transmitted on each transmission channel for a particular level of performance. Moreover, the link conditions typically vary with time. As a result, the supported information bit rates for the transmission channels also vary with time. To more fully utilize the capacity of the transmission channels, CSI descriptive of the link conditions may be determined (typically at the receiver unit) and provided to the transmitter unit so that the processing can be adjusted (or adapted) accordingly. Aspects of the invention provide techniques to determine and utilize (full or partial) CSI to provide improved system performance.

MIMO Transmitter System with Partial-CSI Processing

Figure 2A:
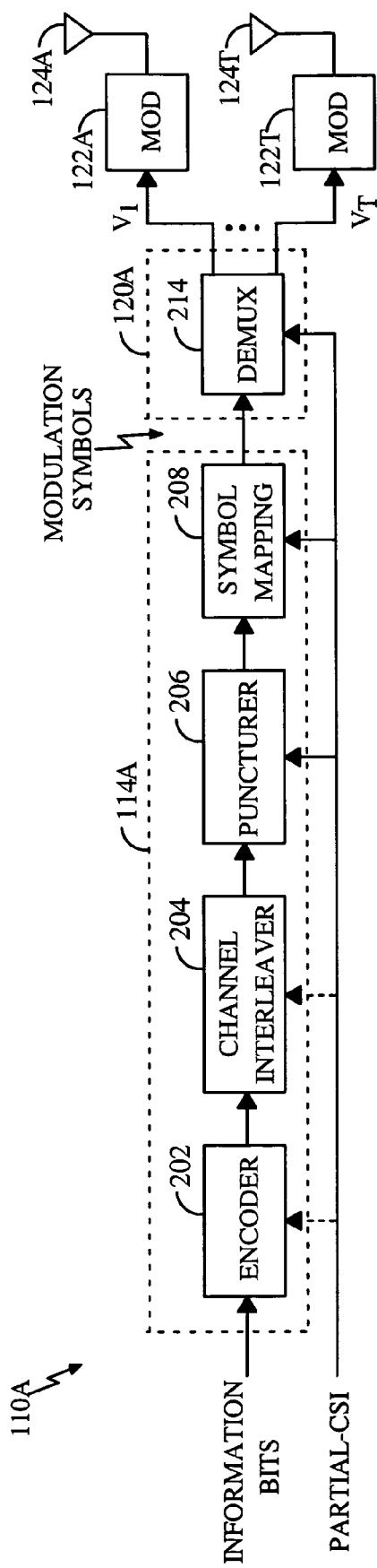
FIGS. 2A and 2B are block diagrams of an embodiment of a MIMO transmitter system capable of performing partial-CSI processing and full-CSI processing, respectively.

FIG. 2A is a block diagram of an embodiment of a MIMO transmitter system 110a, which is one embodiment of the transmitter portion of system 110 in FIG. 1. Transmitter system 110a (which does not utilize OFDM) is capable of adjusting its processing based on partial CSI reported by receiver system 150. System 110a includes (1) a TX data processor 114a that receives and processes information bits to provide modulation symbols and (2) a TX MIMO processor 120a that demultiplexes the modulation symbols for the $N_T$ transmit antennas.

TX data processor 114a is one embodiment of TX data processor 114 in FIG. 1, and many other designs may also be used for TX data processor 114 and are within the scope of the invention. In the specific embodiment shown in FIG. 2A, TX data processor 114a includes an encoder 202, a channel interleaver 204, a puncturer 206, and a symbol mapping element 208. Encoder 202 receives and encodes the information bits in accordance with a particular encoding scheme to provide coded bits. Channel interleaver 204 interleaves the coded bits based on a particular interleaving scheme to provide diversity. Puncturer 206 punctures zero or more of the interleaved coded bits to provide the desired number of coded bits. And symbol mapping element 208 maps the unpunctured coded bit into modulation symbols for one or more transmission channels used for transmitting the data.

Although not shown in FIG. 2A for simplicity, pilot data (e.g., data of known pattern) may be encoded and multiplexed with the processed information bits. The processed pilot data may be transmitted (e.g., in a time division multiplexed manner) in all or a subset of the transmission channels used to transmit the information bits. The pilot data may be used at the receiver to perform channel estimation, as is known in the art and described in further detail below.

As shown in FIG. 2A, the encoding and modulation may be adjusted based on the partial-CSI reported by receiver system 150. In an embodiment, adaptive encoding is achieved by using a fixed base code (e.g., a rate 1/3 Turbo code) and adjusting the puncturing to achieve the desired code rate, as supported by the SNR of the transmission channel used to transmit data. Alternatively, different coding schemes may be used based on the reported partial-CSI (as indicated by the dashed arrow into block 202). For example, each of the transmission channels may be coded with an independent code. With this coding scheme, a successive "nulling/equalization and interference cancellation" receiver processing scheme may be used to detect and decode the data streams to derive a more reliable estimate of the transmitted data streams. One such receiver processing scheme is described by P. W. Wolniansky, et al in a paper entitled "V-BLAST: An Architecture for Achieving Very High Data Rates over the Rich-Scattering Wireless Channel", Proc. ISSSE-98, Pisa, Italy, and incorporated herein by reference.

For each transmission channel, symbol mapping element 208 can be designed to group sets of unpunctured coded bits to form non-binary symbols, and to map the non-binary symbols into points in a signal constellation corresponding to a particular modulation scheme (e.g., QPSK, M-PSK, M-QAM, or some other scheme) selected for that transmission channel. Each mapped point corresponds to a modulation symbol. The number of information bits that may be transmitted for each modulation symbol for a particular level of performance (e.g., one percent packet error rate) is dependent on the SNR of the transmission channel. Thus, the coding scheme and modulation scheme for each transmission channel may be selected based on the reported partial-CSI. The channel interleaving may also be adjusted based on the reported partial-CSI (as indicated by the dashed arrow into block 204).

Table 1 lists various combinations of coding rate and modulation scheme that may be used for a number of SNR ranges. The supported bit rate for each transmission channel may be achieved using any one of a number of possible combinations of coding rate and modulation scheme. For example, one information bit per symbol may be achieved using (1) a coding rate of 1/2 and QPSK modulation, (2) a coding rate of 1/3 and 8-PSK modulation, (3) a coding rate of 1/4 and 16-QAM, or some other combination of coding rate and modulation scheme. In Table 1, QPSK, 16-QAM, and 64-QAM are used for the listed SNR ranges. Other modulation schemes such as 8-PSK, 32-QAM, 128-QAM, and so on, may also be used and are within the scope of the invention.

TABLE 1

| SNR Range | # of Information Bits/Symbol | Modulation Symbol | # of Coded Bits/Symbol | Coding Rate |
|---|---|---|---|---|
| 1.5–4.4 | 1 | QPSK | 2 | 1/2 |
| 4.4–6.4 | 1.5 | QPSK | 2 | 3/4 |
| 6.4–8.35 | 2 | 16-QAM | 4 | 1/2 |
| 8.35–10.4 | 2.5 | 16-QAM | 4 | 5/8 |
| 10.4–12.3 | 3 | 16-QAM | 4 | 3/4 |
| 12.3–14.15 | 3.5 | 64-QAM | 6 | 7/12 |
| 14.15–15.55 | 4 | 64-QAM | 6 | 2/3 |
| 15.55–17.35 | 4.5 | 64-QAM | 6 | 3/4 |
| >17.35 | 5 | 64-QAM | 6 | 5/6 |

The modulation symbols from TX data processor 114a are provided to a TX MIMO processor 120a, which is one embodiment of TX MIMO processor 120 in FIG. 1. Within TX MIMO processor 120a, a demultiplexer 214 demultiplexes the received modulation symbols into a number of ($N_T$) streams of modulation symbols, one stream for each antenna used to transmit the modulation symbols. Each stream of modulation symbols is provided to a respective modulator 122. Each modulator 122 converts the modulation symbols into an analog signal, and further amplifies, filters, quadrature modulates, and upconverts the signal to generate a modulated signal suitable for transmission over the wireless link.

If the number of spatial subchannels is less than the number of available transmit antennas (i.e., $N_C < N_T$) then various schemes may be used for the data transmission. In one scheme, $N_C$ modulation symbol steams are generated and transmitted on a subset (i.e., $N_C$) of the available transmitted antennas. The remaining ($N_T-N_C$) transmit antennas are not used for the data transmission. In another scheme, the additional degrees of freedom provided by the ($N_T-N_C$) additional transmit antennas are used to improve the reliability of the data transmission. For this scheme, each of one or more data streams may be encoded, possibly interleaved, and transmitted over multiple transmit antennas. The use of multiple transmit antennas for a data stream increases diversity and improves reliability against deleterious path effects.

MIMO Transmitter System with Full-CSI Processing

Figure 2B:
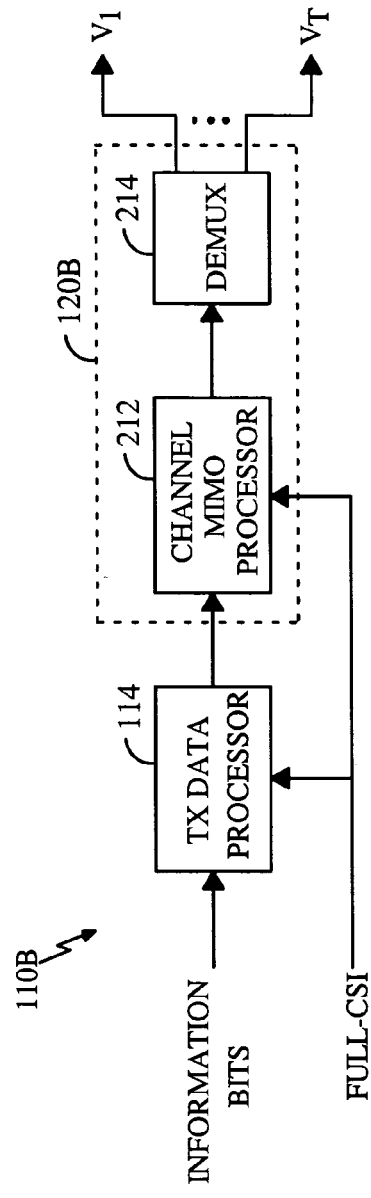

FIG. 2B is a block diagram of an embodiment of a MIMO transmitter system 110b (which does not utilize OFDM) capable of processing data based on full CSI reported by receiver system 150. The information bits are encoded, interleaved, and symbol mapped by a TX data processor 114 to generate modulation symbols. The coding and modulation may be adjusted based on the available full-CSI reported by the receiver system, and may be performed as described above for MIMO transmitter system 110a.

Within a TX MIMO processor 120b, a channel MIMO processor 212 demultiplexes the received modulation symbols into a number of ($N_c$) modulation symbol streams, one stream for each spatial subchannel (i.e., eigenmode) used to transmit the modulation symbols. For full-CSI processing, channel MIMO processor 212 preconditions the $N_c$ modulation symbols at each time slot to generate $N_T$ preconditioned modulation symbols, as follows:

$$\begin{bmatrix} x_1 \\ x_2 \\ \vdots \\ x_{N_T} \end{bmatrix} = \begin{bmatrix} e_{11}, & e_{12}, & & e_{1N_C} \\ e_{21}, & e_{22}, & & e_{2N_C} \\ & & & \\ e_{N_T 1}, & e_{N_T 1}, & & e_{N_T N_C} \end{bmatrix} \cdot \begin{bmatrix} b_1 \\ b_2 \\ \vdots \\ b_{N_C} \end{bmatrix} \quad \text{Eq (1)}$$

where $b_1, b_2, \ldots$ and $b_{N_C}$ are respectively the modulation symbols for the spatial subchannels $1, 2, \ldots N_{N_C}$, where each of the $N_C$ modulation symbols may be generated using, for example, M-PSK, M-QAM, or some other modulation scheme;

$e_{ij}$ are elements of an eigenvector matrix E related to the transmission characteristics from the transmit antennas to the receive antennas; and $x_1, x_2, \ldots x_{N_T}$ are the preconditioned modulation symbols, which can be expressed as:

$$x_1 = b_1 \cdot e_{11} + b_2 \cdot e_{12} + \ldots + b_{N_C} \cdot e_{1N_C},$$

$$x_2 = b_1 \cdot e_{21} + b_2 \cdot e_{22} + \ldots + b_{N_C} \cdot e_{2N_C}, \text{ and}$$

$$x_{N_T} = b_1 \cdot e_{N_T 1} + b_2 \cdot e_{N_T 2} + \ldots + b_{N_C} \cdot e_{N_T N_C}.$$

The eigenvector matrix E may be computed by the transmitter or is provided to the transmitter by the receiver.

For full-CSI processing, each preconditioned modulation symbol, $x_i$, for a particular transmit antenna represents a linear combination of (weighted) modulation symbols for up to $N_C$ spatial subchannels. The modulation scheme employed for each of the modulation symbol $x_i$ is based on the effective SNR of that eigenmode and is proportional to an eigenvalue, $\lambda_i$ (described below). Each of the $N_C$ modulation symbols used to generate each preconditioned modulation symbol may be associated with a different signal constellation. For each time slot, the $N_T$ preconditioned modulation symbols generated by channel MIMO processor 212 are demultiplexed by a demultiplexer 214 and provided to $N_T$ modulators 122.

The full-CSI processing may be performed based on the available CSI and on the selected transmit antennas. The full-CSI processing may also be enabled and disabled selectively and dynamically. For example, the full-CSI processing may be enabled for a particular data transmission and disabled for some other data transmissions. The full-CSI processing may be enabled under certain conditions, for example, when the communication link has adequate SNR.

MIMO Transmitter System with OFDM

Figure 3:
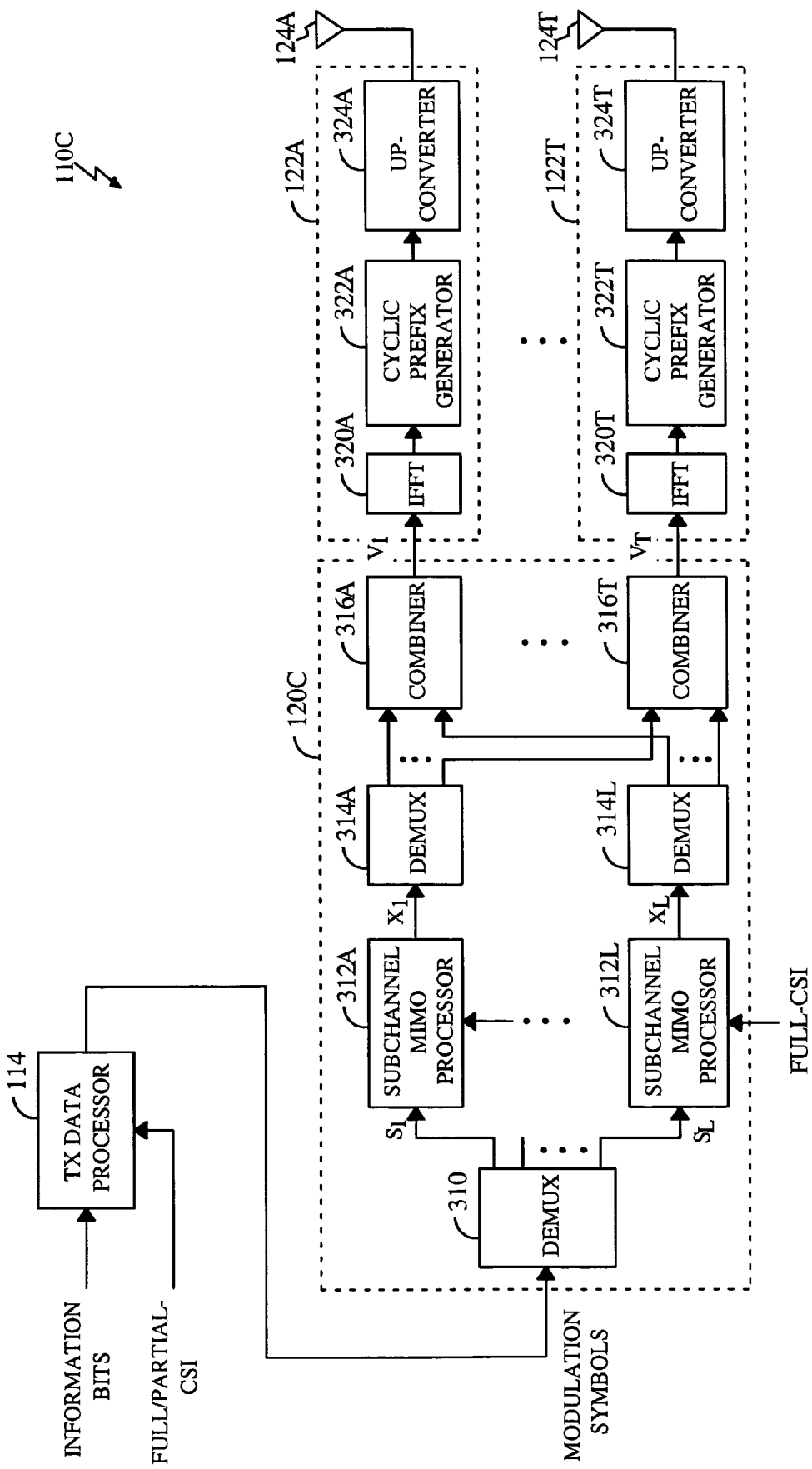
FIG. 3 is a block diagram of an embodiment of a MIMO transmitter system which utilizes orthogonal frequency division modulation (OFDM)

FIG. 3 is a block diagram of an embodiment of a MIMO transmitter system 110c, which utilizes OFDM and is capable of adjusting its processing based on full or partial CSI. The information bits are encoded, interleaved, punctured, and symbol mapped by a TX data processor 114 to generate modulation symbols. The coding and modulation may be adjusted based on the available full or partial CSI reported by the receiver system. For a MIMO system with OFDM, the modulation symbols may be transmitted on multiple frequency subchannels and from multiple transmit antennas. When operating in a pure MIMO communication mode, the transmission on each frequency subchannel and from each transmit antenna represents non-duplicated data.

Within a MIMO processor 120c, a demultiplexer (DE-MUX) 310 receives and demultiplexes the modulation symbols into a number of subchannel symbol streams, S1 through $S_L$, one subchannel symbol stream for each frequency subchannel used to transmit the symbols.

For full-CSI processing, each subchannel symbol stream is then provided to a respective subchannel MIMO processor 312. Each subchannel MIMO processor 312 demultiplexes the received subchannel symbol stream into a number of (up to $N_C$) symbol substreams, one symbol substream for each spatial subchannel used to transmit the modulation symbols. For full-CSI processing in an OFDM system, the eigenmodes are derived and applied on a per frequency subchannel basis. Thus, each subchannel MIMO processors 312 preconditions up to $N_C$ modulation symbols in accordance with equation (1) to generate preconditioned modulation symbols. Each preconditioned modulation symbol for a particular transmit antenna of a particular frequency subchannel represents a linear combination of (weighted) modulation symbols for up to $N_C$ spatial subchannels.

For full-CSI processing, the (up to) $N_T$ preconditioned modulation symbols generated by each subchannel MIMO processor 312 for each time slot are demultiplexed by a respective demultiplexer 314 and provided to (up to) $N_T$ symbol combiners 316a through 316t. For example, subchannel MIMO processor 312a assigned to frequency subchannel 1 may provide up to $N_T$ preconditioned modulation symbols for frequency subchannel 1 of antennas 1 through $N_T$. Similarly, subchannel MIMO processor 312l assigned to frequency subchannel L may provide up to $N_T$ symbols for frequency subchannel L of antennas 1 through $N_T$.

And for partial-CSI processing, each subchannel symbol stream, S, is demultiplexed by a respective demultiplexer 314 and provided to (up to) $N_T$ symbol combiners 316a through 316t. The processing by subchannel MIMO processor 312 is bypassed for partial-CSI processing.

Each combiner 316 receives the modulation symbols for up to L frequency subchannels, combines the symbols for each time slot into a modulation symbol vector V, and provides the modulation symbol vector to the next processing stage (i.e., modulator 122).

MIMO processor 120c thus receives and processes the modulation symbols to provide $N_T$ modulation symbol vectors, $V_1$ through $V_T$, one modulation symbol vector for each transmit antenna. Each modulation symbol vector V covers a single time slot, and each element of the modulation symbol vector V is associated with a specific frequency subchannel having a unique subcarrier on which the modulation symbol is conveyed. If not operating in a "pure" MIMO communication mode, some of the modulation symbol vectors may have duplicate or redundant information on specific frequency subchannels for different transmit antennas.

FIG. 3 also shows an embodiment of modulator 122 for OFDM. The modulation symbol vectors $V_1$ through $V_T$ from MIMO processor 120c are provided to modulators 122a through 122t, respectively. In the embodiment shown in FIG. 3, each modulator 122 includes an inverse Fast Fourier Transform (IFFT) 320, cycle prefix generator 322, and an upconverter 324.

IFFT 320 converts each received modulation symbol vector into its time-domain representation (which is referred to as an OFDM symbol) using IFFT. IFFT 320 can be designed to perform the IFFT on any number of frequency subchannels (e.g., 8, 16, 32, and so on). In an embodiment, for each modulation symbol vector converted to an OFDM symbol, cycle prefix generator 322 repeats a portion of the time-domain representation of the OFDM symbol to form a transmission symbol for a specific transmit antenna. The cyclic prefix insures that the transmission symbol retains its orthogonal properties in the presence of multipath delay spread, thereby improving performance against deleterious path effects. The implementation of IFFT 320 and cycle prefix generator 322 is known in the art and not described in detail herein.

The time-domain representations from each cycle prefix generator 322 (i.e., the transmission symbols for each antenna) are then processed (e.g., converted into an analog signal, modulated, amplified, and filtered) by upconverter 324 to generate a modulated signal, which is then transmitted from the respective antenna 124.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

A number of different types of transmission (e.g., voice, signaling, data, pilot, and so on) may be transmitted by a communication system. Each of these transmissions may require different processing.

Figure 4:
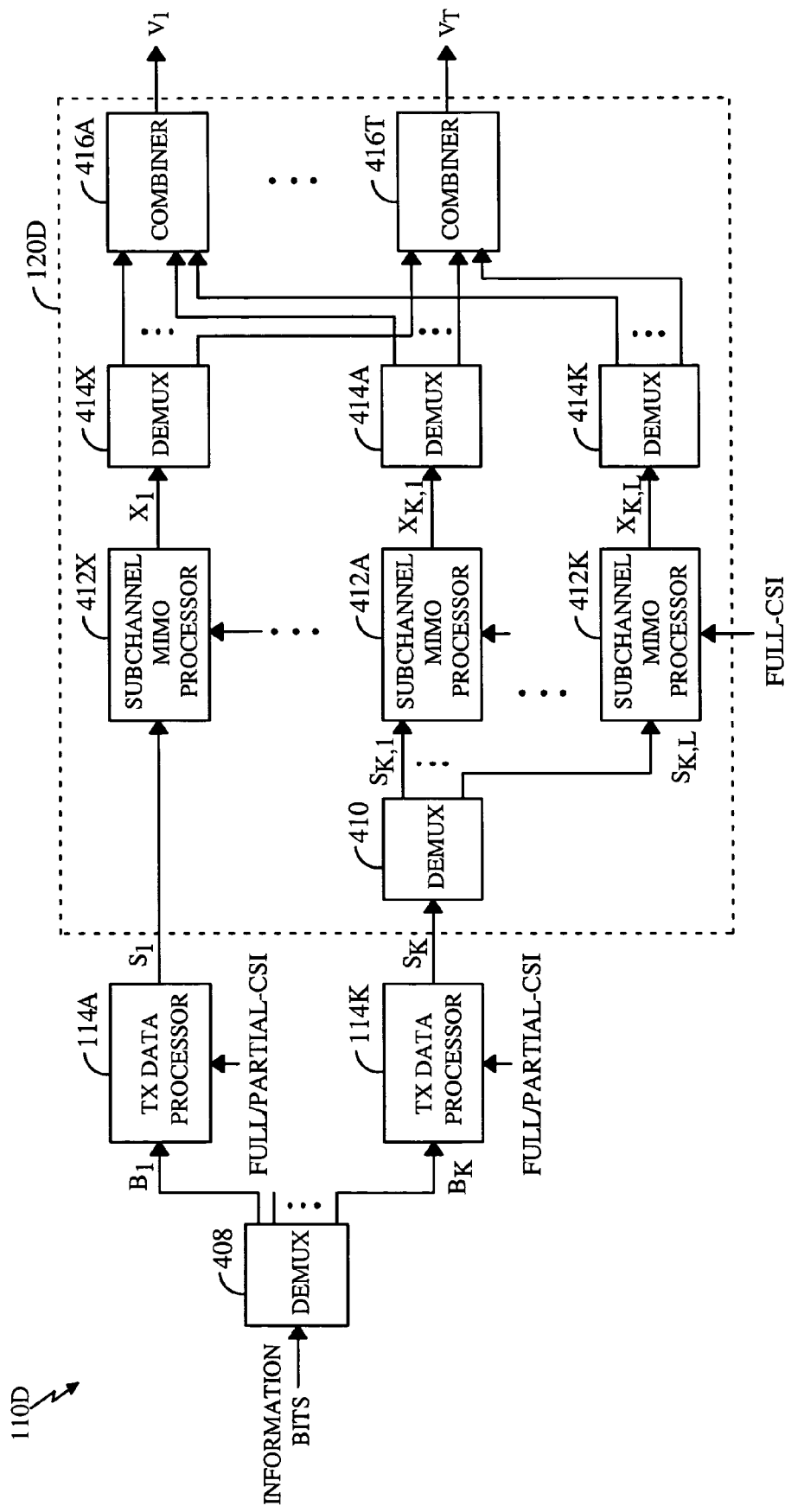
FIG. 4 is a block diagram of a portion of a MIMO transmitter system capable of providing different processing for different transmission types and which also employs OFDM.

FIG. 4 is a block diagram of a portion of a MIMO transmitter system 110d capable of providing different processing for different transmission types and which also employs OFDM. The aggregate input data, which includes all information bits to be transmitted by system 110d, is provided to a demultiplexer 408. Demultiplexer 408 demultiplexes the input data into a number of (K) channel data streams, $B_1$ through $B_K$. Each channel data stream may correspond to, for example, a signaling channel, a broadcast channel, a voice call, or a packet data transmission. Each channel data stream is provided to a respective TX data processor 114 that encodes the data using a particular encoding scheme selected for that channel data stream, interleaves the encoded data based on a particular interleaving scheme, and maps the interleaved bits into modulation symbols for one or more transmission channels used for transmitting that channel data stream.

The encoding can be performed on a per transmission basis (i.e., on each channel data stream, as shown in FIG. 4). However, the encoding may also be performed on the aggregate input data (as shown in FIG. 1), on a number of channel data streams, on a portion of a channel data stream, across a set of frequency subchannels, across a set of spatial subchannels, across a set of frequency subchannels and spatial subchannels, across each frequency subchannel, on each modulation symbol, or on some other unit of time, space, and frequency.

The modulation symbol stream from each TX data processor 114 may be transmitted on one or more frequency subchannels and via one or more spatial subchannels of each frequency subchannel. A TX MIMO processor 120d receives the modulation symbol streams from TX data processors 114. Depending on the communication mode to be used for each modulation symbol stream, TX MIMO processor 120d may demultiplex the modulation symbol stream into a number of subchannel symbol streams. In the embodiment shown in FIG. 4, modulation symbol stream $S_1$ is transmitted on one frequency subchannel and modulation symbol stream $S_K$ is transmitted on L frequency subchannels. The modulation stream for each frequency subchannel is processed by a respective subchannel MIMO processor 412, demultiplexed by demultiplexer 414, and combined by combiner 416 (e.g., in similar manner as that described in FIG. 3) to form a modulation symbol vector for each transmit antenna.

In general, a transmitter system codes and modulates data for each transmission channel based on information descriptive of that channel's transmission capability. This information is typically in the form of full CSI or partial CSI described above. The full/partial-CSI for the transmission channels used for data transmission is typically determined at the receiver system and reported back to the transmitter system, which then uses the information to adjust the coding and modulation accordingly. The techniques described herein are applicable for multiple parallel transmission channels supported by MIMO, OFDM, or any other communication scheme (e.g., a CDMA scheme) capable of supporting multiple parallel transmission channels.

MIMO processing is described in further detail in U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000, assigned to the assignee of the present application and incorporated herein by reference.

MIMO Receiver System

Aspects of the invention provide techniques to process the received signals in a MIMO system to recover the transmitted data, and to estimate the characteristics of the MIMO channel. The estimated channel characteristics may then be reported back to the transmitter system and used to adjust the signal processing (e.g., coding, modulation, and so on). In this manner, high performance is achieved based on the determined channel conditions. The receiver processing techniques described herein include a channel correlation matrix inversion (CCMI) technique, an unbiased minimum mean square error (UMMSE) technique, and a full-CSI technique, all of which are described in further detail below. Other receiver processing techniques may also be used and are within the scope of the invention.

FIG. 1 shows receiver system 150 having multiple ($N_R$) receive antennas and capable of processing a data transmission. The transmitted signals from up to $N_T$ transmit antennas are received by each of $N_R$ antennas 152a through 152r and routed to a respective demodulator (DEMOD) 154 (which is also referred to as a front-end processor). For example, receive antenna 152a may receive a number of transmitted signals from a number of transmit antennas, and receive antenna 152r may similarly receive multiple transmitted signals. Each demodulator 154 conditions (e.g., filters and amplifies) the received signal, downconverts the conditioned signal to an intermediate frequency or baseband, and digitizes the downconverted signal. Each demodulator 154 may further demodulate the digitized samples with a received pilot to generate received modulation symbols, which are provided to RX MIMO processor 156.

If OFDM is employed for the data transmission, each demodulator 154 further performs processing complementary to that performed by modulator 122 shown in FIG. 3. In this case, each demodulator 154 includes an FFT processor (not shown) that generates transformed representations of the samples and provides a stream of modulation symbol vectors, with each vector including L modulation symbols for L frequency subchannels. The modulation symbol vector streams from the FFT processors of all demodulators are then provided to a demultiplexer/combiner (not shown in FIG. 5), which first "channelizes" the modulation symbol vector stream from each FFT processor into a number of (up to L) subchannel symbol streams. Each of (up to) L subchannel symbol streams may then be provided to a respective RX MIMO processor 156.

For a MIMO system not utilizing OFDM, one RX MIMO processor 156 may be used to perform the MIMO processing for the modulation symbols from the $N_R$ received antennas. And for a MIMO system utilizing OFDM, one RX MIMO processor 156 may be used to perform the MIMO processing for the modulation symbols from the $N_R$ received antennas for each of the L frequency subchannels used for data transmission.

In a MIMO system with $N_T$ transmit antennas and $N_R$ receive antennas, the received signals at the output of the $N_R$ receive antennas may be expressed as:

$$r = Hx + n, \qquad \text{Eq (2)}$$

where r is the received symbol vector (i.e., the $N_R$ x 1 vector output from the MIMO channel, as measured at the receive antennas), H is the $N_R$ x $N_T$ channel coefficient matrix that gives the channel response for the $N_T$ transmit antennas and $N_R$ receive antennas at a specific time, x is the transmitted symbol vector (i.e., the $N_T$ x 1 vector input into the MIMO channel), and n is an $N_R$ x 1 vector representing noise plus interference. The received symbol vector r includes $N_R$ modulation symbols from $N_R$ signals received via $N_R$ receive antennas at a specific time. Similarly, the transmitted symbol vector x includes $N_T$ modulation symbols in $N_T$ signals transmitted via $N_T$ transmit antennas at a specific time.

MIMO Receiver Utilizing CCMI Technique

For the CCMI technique, the receiver system first performs a channel matched filter operation on the received symbol vector r, and the filtered output can be expressed as:

$$H^H r = H^H H x + H^H n, \qquad \text{Eq (3)}$$

where the superscript "$H$" represents transpose and complex conjugate. A square matrix R may be used to denote the product of the channel coefficient matrix H with its conjugate-transpose $H^H$ (i.e., $R=H^HH$).

The channel coefficient matrix H may be derived, for example, from pilot symbols transmitted along with the data. In order to perform optimal reception and to estimate the SNR of the transmission channels, it is often convenient to insert some known symbols into the transmit data stream and to transmit the known symbols over one or more transmission channels. Such known symbols are also referred to as pilot symbols or pilot signals. Methods for estimating a single transmission channel based on a pilot signal or the data transmission may be found in a number of papers available in the art. One such channel estimation method is described by F. Ling in a paper entitled "Optimal Reception, Performance Bound, and Cutoff-Rate Analysis of References-Assisted Coherent CDMA Communications with Applications," IEEE Transaction on Communication, October 1999. This or some other channel estimation method may be extended to matrix form to derive the channel coefficient matrix H.

An estimate of the transmitted symbol vector, x', may be obtained by multiplying the signal vector $H^Hr$ with the inverse (or pseudo-inverse) of R, which can be expressed as:

$$\underline{x}' = R^{-1}H^H\underline{r} \quad \text{Eq (4)}$$
$$= \underline{x} + R^{-1}H^H\underline{n}$$
$$= \underline{x} + \underline{n}'.$$

From the above equations, it can be observed that the transmitted symbol vector x may be recovered by matched filtering (i.e., multiplying with the matrix $H^H$) the received symbol vector r and then multiplying the filtered result with the inverse square matrix $R^{-1}$.

The SNR of the transmission channels may be determined as follows. The autocorrelation matrix $\phi_{nn}$ of the noise vector n is first computed from the received signal. In general, $\phi_{nn}$ is a Hermitian matrix, i.e., it is complex-conjugate-symmetric. If the components of the channel noise are uncorrelated and further independent and identically distributed (iid), the autocorrelation matrix $\phi_{nn}$ of the noise vector n can be expressed as:

$$\phi_{nn} = \sigma_n^2 I, \text{ and} \quad \text{Eq (5)}$$
$$\phi_{nn}^{-1} = \frac{1}{\sigma_n^2}I,$$

where I is the identity matrix (i.e., ones along the diagonal and zeros otherwise) and $\sigma_n^2$ is the noise variance of the received signals. The autocorrelation matrix $\phi_{n'n'}$ of the post-processed noise vector n' (i.e., after the matched filtering and pre-multiplication with the matrix $R^{-1}$) can be expressed as:

$$\phi_{n'n'} = E[\underline{n}'\underline{n}'^H] \quad \text{Eq (6)}$$
$$= \sigma_n^2 R^{-1}$$

From equation (6), the noise variance $\sigma_{n'}^2$ of the i-th element of the post-processed noise n' is equal to $\sigma_n^2 \breve{r}_{ii}$, where $\breve{r}_{ii}$ is the i-th diagonal element of $R^{-1}$. For a MIMO system not utilizing OFDM, the i-th element is representative of the i-th receive antenna. And if OFDM is utilized, then the subscript "i" may be decomposed into a subscript "jk", where "j" represents the j-th frequency subchannel and "k" represents the k-th spatial subchannel corresponding to the k-th receive antenna.

For the CCMI technique, the SNR of the i-th element of the received symbol vector after processing (i.e., the i-th element of x') can be expressed as:

$$SNR_i = \frac{\overline{|x_i'|^2}}{\sigma_{n'}^2}. \quad \text{Eq (7)}$$

If the variance of the i-th transmitted symbol $\overline{|x_i'|^2}$ is equal to one (1.0) on the average, the SNR of the receive symbol vector may be expressed as:

$$SNR_i = \frac{1}{\breve{r}_{ii}\sigma_n^2}.$$

The noise variance may be normalized by scaling the i-th element of the received symbol vector by $1/\sqrt{\breve{r}_{ii}}$.

The scaled signals from the $N_R$ receive antennas may be summed together to form a combined signal, which may be expressed as:

$$x'_{total} = \sum_{i=1}^{N_R} \frac{x_i'}{\breve{r}_{ii}}. \quad \text{Eq (8)}$$

The SNR of the combined signal, $SNR_{total}$, would then have a maximal combined SNR that is equal to the sum of the SNR of the signals from the $N_R$ receive antennas. The combined SNR may be expressed as:

$$SNR_{total} = \sum_{i=1}^{N_R} SNR_i = \frac{1}{\sigma_n^2}\sum_{i=1}^{N_R} \frac{1}{\breve{r}_{ii}}. \quad \text{Eq (9)}$$

Figure 5:
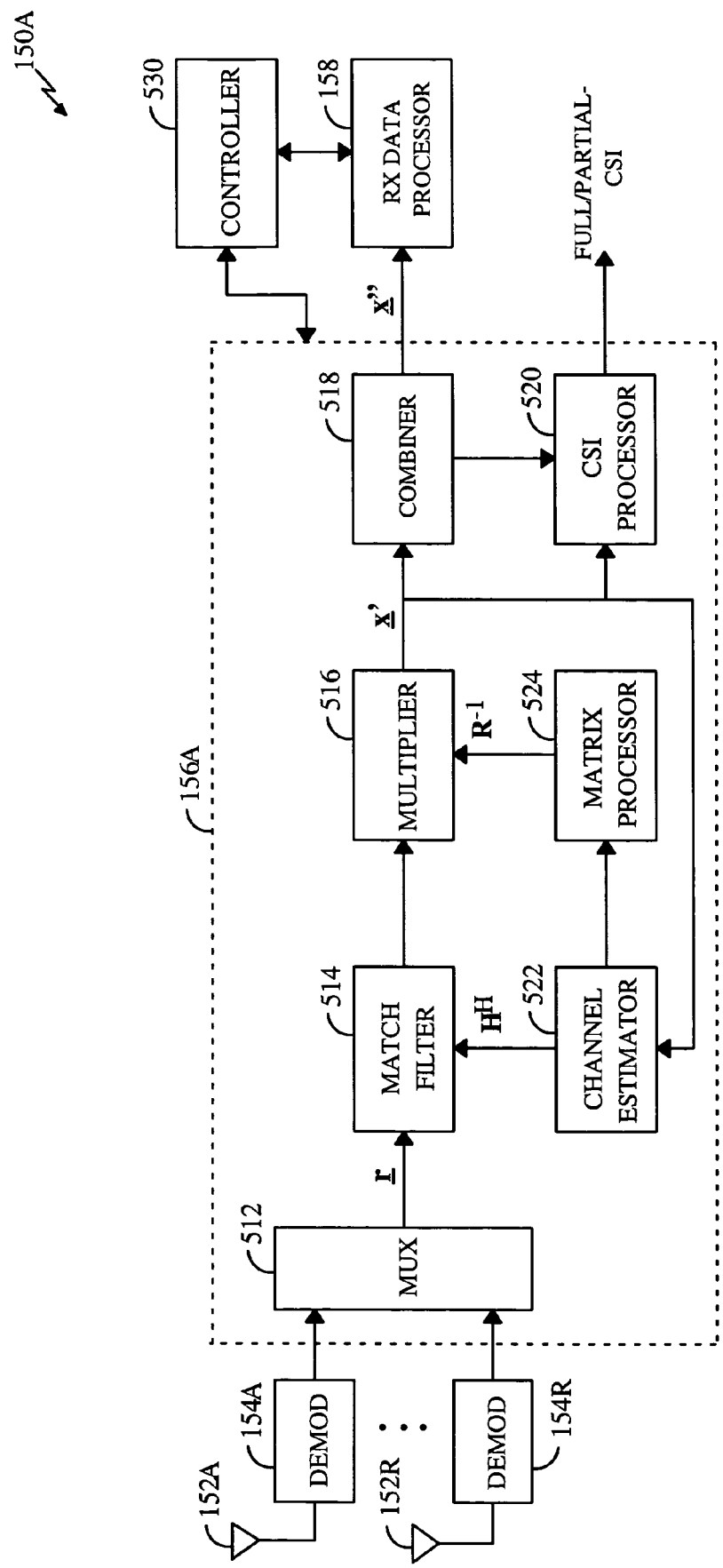
FIGS. 5 and 6 are block diagrams of two embodiments of a receiver system having multiple ($N_R$) receive antennas and capable of processing a data transmission based on a channel correlation matrix inversion (CCMI) technique and an unbiased minimum mean square error (UMMSE), respectively.

FIG. 5 shows an embodiment of an RX MIMO processor 156a, which is capable of implementing the CCMI processing described above. Within RX MIMO processor 156a, the modulation symbols from the $N_R$ receive antennas are multiplexed by a multiplexer 512 to form a stream of received modulation symbol vectors r. The channel coefficient matrix H may be estimated based on pilot signals similar to conventional pilot assisted single and multi-carrier systems, as is known in the art. The matrix R is then computed according to $R=H^HH$ as shown above. The received modulation symbol vectors r are then filtered by a match filter 514, which pre-multiplies each vector r with the conjugate-transpose channel coefficient matrix $H^H$, as shown above in equation (3). The filtered vectors are further pre-multiplied by a multiplier 516 with the inverse square matrix $R^{-1}$ to form an estimate x' of the transmitted modulation symbol vector x, as shown above in equation (4).

For certain communication modes, the subchannel symbol streams from all antennas used for the transmission of the channel data stream may be provided to a combiner 518, which combines redundant information across time, space, and frequency. The combined modulation symbols x" are then provided to RX data processor 158. For some other communication modes, the estimated modulation symbols x' may be provided directly to RX data processor 158 (not shown in FIG. 5).

RX MIMO processor 156*a* thus generates a number of independent symbol streams corresponding to the number of transmission channels used at the transmitter system. Each symbol stream includes post-processed modulation symbols, which correspond to the modulation symbols prior to the full/partial-CSI processing at the transmitter system. The (post-processed) symbol streams are then provided to RX data processor 158.

Within RX data processor 158, each post-processed symbol stream of modulation symbols is provided to a respective demodulation element that implements a demodulation scheme (e.g., M-PSK, M-QAM) that is complementary to the modulation scheme used at the transmitter system for the transmission channel being processed. For the MIMO communication mode, the demodulated data from all assigned demodulators may then be decoded independently or multiplexed into one channel data stream and then decoded, depending upon the coding and modulation method employed at the transmitter unit. Each channel data stream may then be provided to a respective decoder that implements a decoding scheme complementary to that used at the transmitter unit for the channel data stream. The decoded data from each decoder represents an estimate of the transmitted data for that channel data stream.

The estimated modulation symbols x' and/or the combined modulation symbols x" are also provided to a CSI processor 520, which determines full or partial CSI for the transmission channels and provides the full/partial-CSI to be reported back to transmitter system 110. For example, CSI processor 520 may estimate the noise covariance matrix $\phi_{nn}$ of the i-th transmission channel based on the received pilot signal and then compute the SNR based on equations (7) and (9). The SNR can be estimated similar to conventional pilot assisted single and multi-carrier systems, as is known in the art. The SNR for the transmission channels comprises the partial-CSI that is reported back to the transmitter system. The modulation symbols are further provided to a channel estimator 522 and a matrix processor 524 that respectively estimates the channel coefficient matrix H and derive the square matrix R. A controller 530 couples to RX MIMO processor 156*a* and RX data processor 158 and directs the operation of these units.

MIMO Receiver Utilizing UMMSE Technique

For the UMMSE technique, the receiver system performs a multiplication of the received symbol vector r with a matrix M to derive an initial MMSE estimate $\hat{x}$ of the transmitted symbol vector x, which can be expressed as:

$$\hat{x} = Mr. \quad \text{Eq (10)}$$

The matrix M is selected such that the mean square error of the error vector e between the initial MMSE estimate $\hat{x}$ and the transmitted symbol vector x (i.e., $e=\hat{x}-x$) is minimized.

To determine M, a cost function $\epsilon$ can first be expressed as:

$$\begin{aligned}\varepsilon &= E\{\underline{e}^H \underline{e}\} \\ &= E\{[\underline{r}^H M^H - \underline{x}^H][M\underline{r} - \underline{x}]\} \\ &= E\{\underline{r}^H M^H M\underline{r} - 2\text{Re}[\underline{x}^H M\underline{r}] + \underline{x}^H \underline{x}\}.\end{aligned}$$

To minimize the cost function $\epsilon$, a derivative of the cost function can be taken with respect to M, and the result can be set to zero, as follows:

$$\frac{\partial}{\partial M}\varepsilon = 2(HH^H + \phi_{nn})M^H - 2H = 0.$$

Using the equalities $E\{xx^H\}=I$, $E\{rr^H\}=HH^H+\phi_{nn}$, and $E\{rx^H\}=H$, the following is obtained:

$$2(HH^H+\phi_{nn})M^H = 2H.$$

Thus, the matrix M can be expressed as:

$$M = H^H(HH^H+\phi_{nn})^{-1}. \quad \text{Eq (11)}$$

Based on equations (10) and (11), the initial MMSE estimate $\hat{x}$ of the transmitted symbol vector x can be determined as:

$$\begin{aligned}\hat{x} &= M\underline{r} \\ &= H^H(HH^H + \phi_{nn})^{-1}\underline{r}.\end{aligned} \quad \text{Eq (12)}$$

To determine the SNR of the transmission channels for the UMMSE technique, the signal component can first be determined based on the mean of $\hat{x}$ given x, averaged over the additive noise, which can be expressed as:

$$\begin{aligned}E[\hat{\underline{x}}|\underline{x}] &= E[M\underline{r}|\underline{x}] \\ &= H^H(HH^H + \phi_{nn})^{-1}E[\underline{r}] \\ &= H^H(HH^H + \phi_{nn})^{-1}H\underline{x} \\ &= V\underline{x},\end{aligned}$$

where the matrix V is defined as:

$$\begin{aligned}V &= \{v_{ij}\} \\ &= MH \\ &= H^H(HH^H+\phi_{nn})^{-1}H.\end{aligned}$$

Using the identity $$(HH^H+\phi_{nn})^{-1} = \phi_{nn}^{-1} - \phi_{nn}^{-1}H(I+H^H\phi_{nn}^{-1}H)^{-1}H^H\phi_{nn}^{-1},$$

the matrix V can be expressed as:

$$V = H^H\phi_{nn}^{-1}H(I+H^H\phi_{nn}^{-1}H)^{-1}.$$

The i-th element of the initial MMSE estimate $\hat{x}$, $\hat{x}_i$, can be expressed as:

$$\hat{x}_i = v_{i1}x_1 + \ldots + v_{ii}x_i + \ldots + v_{iN_R}x_{N_R}. \quad \text{Eq (13)}$$

If all of the elements of $\hat{x}$ are uncorrelated and have zero mean, the expected value of the i-th element of $\hat{x}$ can be expressed as:

$$E[\hat{x}_i|x] = v_{ii}x_i. \quad \text{Eq (14)}$$

As shown in equation (14), $\hat{x}_i$ is a biased estimate of $x_i$. This bias can be removed to obtain improved receiver performance in accordance with the UMMSE technique. An unbiased estimate of $x_i$ can be obtained by dividing $\hat{x}_i$ by $v_{ii}$. Thus, the unbiased minimum mean square error estimate of x, $\tilde{x}$, can be obtained by pre-multiplying the biased estimate $\hat{x}$ by a diagonal matrix $D_V^{-1}$, as follows:

$$\tilde{x} = D_V^{-1}\hat{x}, \quad \text{Eq (15)}$$

where $$D_V^{-1} = \text{diag}(1/v_{11}, 1/v_{22}, \ldots, 1/v_{N_R N_R}).$$

To determine the noise plus interference, the error $\hat{e}$ between the unbiased estimate $\tilde{x}$ and the transmitted symbol vector x can be expressed as:

$$\hat{e} = \underline{x} - D_V^{-1}\hat{\underline{x}}$$
$$= \underline{x} - D_V^{-1}H^H(HH^H + \phi_{nn})^{-1}\underline{r}.$$

The autocorrelation matrix of the error vector $\hat{e}$ can be expressed as:

$$\phi_{\hat{e}\hat{e}} \cong U \cong \{u_{ij}\} = E[\hat{e}\hat{e}^H]$$
$$= I - D_V^{-1}H^H(HH^H + \phi_{nn})^{-1}H\left(1 - \frac{1}{2}D_V^{-1}\right) -$$
$$\left(1 - \frac{1}{2}D_V^{-1}\right)H^H(HH^H + \phi_{nn})^{-1}HD_V^{-1}.$$

The variance of the i-th element of the error vector $\hat{e}$ is equal to $u_{ii}$. The elements of the error vector $\hat{e}$ are correlated. However, sufficient interleaving may be used such that the correlation between the elements of the error vector $\hat{e}$ can be ignored and only the variance affects system performance.

If the components of the channel noise are uncorrelated and iid, the correlation matrix of the channel noise can be expressed as shown in equation (5). In that case, the autocorrelation matrix of the error vector $\hat{e}$ can be expressed as:

$$\phi_{\hat{e}\hat{e}} = I - D_X^{-1}\left[I - \sigma_n^2(\sigma_n^2 I + R)^{-1}\right]\left(I - \frac{1}{2}D_X^{-1}\right) - \quad \text{Eq (16)}$$
$$\left(I - \frac{1}{2}D_X^{-1}\right)\left[I - \sigma_n^2(\sigma_n^2 I + R)^{-1}\right]D_X^{-1}$$
$$= U = \{u_{ij}\}.$$

And if the components of the channel noise are uncorrelated, then $$U = I - D_V^{-1}H^H(HH^H + \phi_{nn})^{-1}H\left(I - \frac{1}{2}D_V^{-1}\right) - \quad \text{Eq (17)}$$
$$\left(I - \frac{1}{2}D_V^{-1}\right)H^H(HH^H + \phi_{nn})^{-1}HD_V^{-1}.$$

The SNR of the demodulator output corresponding to the i-th transmitted symbol can be expressed as:

$$SNR_i = \frac{E[\overline{|x_i|^2}]}{u_{ii}}. \quad \text{Eq (18)}$$

If the variance, $\overline{|x_i|^2}$, of the processed received symbols, $x_i$, is equal to one (1.0) on the average, the SNR of for the receive symbol vector may be expressed as:

$$SNR_i = \frac{1}{u_{ii}}.$$

Figure 6:
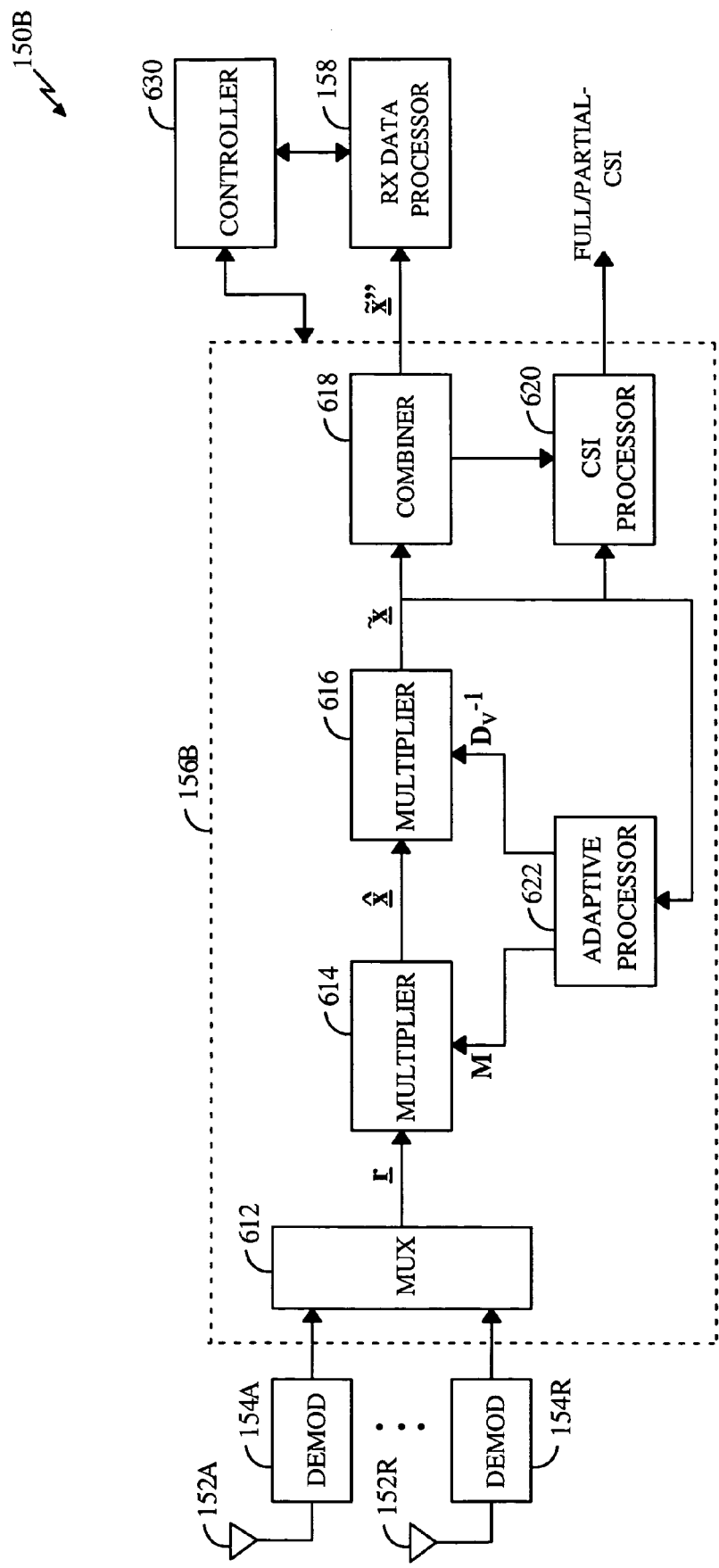

FIG. 6 shows an embodiment of an RX MIMO processor 156b, which is capable of implementing the UMMSE processing described above. Similar to the CCMI method, the matrices H and $\phi_{nn}$ may be first estimated based on the received pilot signals and/or data transmissions. The weighting coefficient matrix M is then computed according to equation (11). Within RX MIMO processor 156b, the modulation symbols from the $N_R$ receive antennas are multiplexed by a multiplexer 612 to form a stream of received modulation symbol vectors r. The received modulation symbol vectors r are then pre-multiplied by a multiplier 614 with the matrix M to form an estimate $\hat{x}$ of the transmitted symbol vector x, as shown above in equation (10). The estimate $\hat{x}$ is further pre-multiplied by a multiplier 616 with the diagonal matrix $D_V^{-1}$ to form an unbiased estimate $\tilde{x}$ of the transmitted symbol vector x, as shown above in equation (15).

Again, depending on the particular communication mode being implemented, the subchannel symbol streams from all antennas used for the transmission of the channel data stream may be provided to a combiner 618, which combines redundant information across time, space, and frequency. The combined modulation symbols $\tilde{x}''$ are then provided to RX data processor 158. And for some other communication modes, the estimated modulation symbols $\tilde{x}$ may be provided directly to RX data processor 158.

The unbiased estimated modulation symbols $\tilde{x}$ and/or the combined modulation symbols $\tilde{x}''$ are also provided to a CSI processor 620, which determines full or partial CSI for the transmission channels and provides the full/partial-CSI to be reported back to transmitter system 110. For example, CSI processor 620 may estimate the SNR of the i-th transmission channel according to equations (16) through (18). The SNR for the transmission channels comprises the partial-CSI that is reported back to the transmitter system. The optimal M as computed in equation (11) should already minimize the norm of the error vector. $D_v$ is computed in accordance with equation (16).

MIMO Receiver Utilizing Full-CSI Technique

For the full-CSI technique, the received signals at the output of the $N_R$ receive antennas may be expressed as shown above in equation (2), which is:

$$r = Hx + n.$$

The eigenvector decomposition of the Hermitian matrix formed by the product of the channel matrix with its conjugate-transpose can be expressed as:

$$H^H H = E \Lambda E^H,$$

where E is the eigenvector matrix, and $\Lambda$ is a diagonal matrix of eigenvalues, both of dimension $N_T \times N_T$. The transmitter preconditions a set of $N_T$ modulation symbols b using the eigenvector matrix E, as shown above in equation (1). The transmitted (preconditioned) modulation symbols from the $N_T$ transmit antennas can thus be expressed as:

$$x = Eb.$$

Since $H^H H$ is Hermitian, the eigenvector matrix is unitary. Thus, if the elements of b have equal power, the elements of x also have equal power. The received signal may then be expressed as:

$$r = HEb + n. \qquad \text{Eq (19)}$$

The receiver performs a channel-matched-filter operation, followed by multiplication by the right eigenvectors. The result of the channel-matched-filter and multiplication operations is a vector z, which can be expressed as:

$$z = E^H H^H H E b + E^H H^H n = \Lambda b + n', \qquad \text{Eq (20)}$$

where the new noise term has covariance that can be expressed as:

$$E(\hat{n}\hat{n}^H) = E(E^H H^H n n^H H E) = E^H H^H H E = \Lambda, \qquad \text{Eq (21)}$$

i.e., the noise components are independent with variance given by the eigenvalues. The SNR of the i-th component of z is $\lambda_i$, the i-th diagonal element of $\Lambda$.

Full-CSI processing is described in further detail in the aforementioned U.S. patent application Ser. No. 09/532,492.

The receiver embodiment shown in FIG. 5 may also be used to implement the full-CSI technique. The received modulation symbol vectors r are filtered by match filter 514, which pre-multiplies each vector r with the conjugate-transpose channel coefficient matrix $H^H$, as shown above in equation (20). The filtered vectors are further pre-multiplied by multiplier 516 with the right eigenvectors $E^H$ to form an estimate z of the modulation symbol vector b, as shown above in equation (20). For the full-CSI technique, matrix processor 524 is configured to provide the right eigenvectors $E^H$. The subsequent processing (e.g., by combiner 518 and RX data processor 158) may be achieved as described above.

For the full-CSI technique, the transmitter unit can select a coding scheme and a modulation scheme (i.e., a signal constellation) for each of the eigenvectors based on the SNR that is given by the eigenvalue. Providing that the channel conditions do not change appreciably in the interval between the time the CSI is measured at the receiver and reported and used to precondition the transmission at the transmitter, the performance of the communications system may be equivalent to that of a set of independent AWGN channels with known SNRs.

Reporting Full or Partial CSI Back to the Transmitter System

Using either the partial-CSI (e.g., CCMI or UMMSE) or full-CSI technique described herein, the SNR of each transmission channel may be obtained for the received signals. The determined SNR for the transmission channels may then be reported back to the transmitter system via a reverse channel. By feeding back the SNR values of the transmitted modulation symbols for the transmission channels (i.e., for each spatial subchannel, and possibly for each frequency subchannel if OFDM is employed), it is possible to implement adaptive processing (e.g., adaptive coding and modulation) to improve utilization of the MIMO channel. For the partial-CSI feedback techniques, adaptive processing may be achieved without complete CSI. For the full-CSI feedback techniques, sufficient information (and not necessarily the explicit eigenvalues and eignemodes) is fed back to the transmitter to facilitate calculation of the eigenvalues and eigenmodes for each frequency subchannel utilized.

For the CCMI technique, the SNR values of the received modulation symbols (e.g., $SNR_i = |x'_i|^2/\sigma_n^2$ or $SNR_i = 1/\sigma_n^2 \tilde{r}_{ii}$ for the symbol received on the i-th transmission channel) are fed back to the transmitter. For the UMMSE technique, the SNR values of the received modulation symbols (e.g., $SNR_i = E[|x_i|^2]/u_{ii}$ or $SNR_i = 1/u_{ii}$ for the symbol received on the i-th transmission channel, with $u_{ii}$ being computed as shown above in equations (16) and (17)) are fed back to the transmitter. And for the full-CSI technique, the SNR values of the received modulation symbols (e.g., $SNR_i = |z_i|^2/\sigma_n^2$ or $SNR_i = \lambda_{ii}/\sigma_n^2$ for the symbol received on the i-th transmission channel, where $\lambda_{ii}$ is the eigenvalue of the square matrix R) can be fed back to the transmitter. For the full-CSI technique, the eigenmodes E may be further determined and fed back to the transmitter. For the partial and full-CSI techniques, the SNR are used at the transmitter system to adjust the processing of the data. And for the full-CSI technique, the eigenmodes E are further used to precondition the modulation symbols prior to transmission.

The CSI to be reported back to the transmitter may be sent in full, differentially, or a combination thereof. In one embodiment, full or partial CSI is reported periodically, and differential updates are sent based on the prior transmitted CSI. As an example for full CSI, the updates may be corrections (based on an error signal) to the reported eigenmodes. The eigenvalues typically do not change as rapidly as the eigenmodes, so these may be updated at a lower rate. In another embodiment, the CSI is sent only when there is a change (e.g., if the change exceeds a particular threshold), which may lower the effective rate of the feedback channel. As an example for partial CSI, the SNRs may be sent back (e.g., differentially) only when they change. For an OFDM system (with or without MIMO), correlation in the frequency domain may be exploited to permit reduction in the amount of CSI to be fed back. As an example for an OFDM system using partial CSI, if the SNR corresponding to a particular spatial subchannel for M frequency subchannels is the same, the SNR and the first and last frequency subchannels for which this condition is true may be reported. Other compression and feedback channel error recovery techniques to reduce the amount of data to be fed back for CSI may also be used and are within the scope of the invention.

Referring back to FIG. 1, the full or partial-CSI (e.g., channel SNR) determined by RX MIMO processor 156 is provided to a TX data processor 162, which processes the CSI and provides processed data to one or more modulators 154.

Modulators 154 further condition the processed data and transmit the CSI back to transmitter system 110 via a reverse channel.

At system 110, the transmitted feedback signal is received by antennas 124, demodulated by demodulators 122, and provided to a RX data processor 132. RX data processor 132 performs processing complementary to that performed by TX data processor 162 and recovers the reported full/partial-CSI, which is then provided to, and used to adjust the processing by, TX data processor 114 and TX MIMO processor 120.

Transmitter system 110 may adjust (i.e., adapt) its processing based on the full/partial-CSI (e.g., SNR information) from receiver system 150. For example, the coding for each transmission channel may be adjusted such that the information bit rate matches the transmission capability supported by the channel SNR. Additionally, the modulation scheme for the transmission channel may be selected based on the channel SNR. Other processing (e.g., interleaving) may also be adjusted and are within the scope of the invention. The adjustment of the processing for each transmission channel based on the determined SNR for the channel allows the MIMO system to achieve high performance (i.e., high throughput or bit rate for a particular level of performance). The adaptive processing can be applied to a single-carrier MIMO system or a multi-carrier based MIMO system (e.g., a MIMO system utilizing OFDM).

The adjustment in the coding and the selection of the modulation scheme at the transmitter system may be achieved based on numerous techniques, one of which is described in the aforementioned U.S. patent application Ser. No. 09/776, 073.

The partial (e.g., CCMI and UMMSE) and full-CSI techniques are receiver processing techniques that allow a MIMO system to utilize the additional dimensionalities created by the use of multiple transmit and receive antennas, which is a main advantage for employing MIMO. The CCMI and UMMSE techniques may allow the same number of modulation symbols to be transmitted for each time slot as for a MIMO system utilizing full CSI. However, other receiver processing techniques may also be used in conjunction with the full/partial-CSI feedback techniques described herein and are within the scope of the invention. Analogously, FIGS. 5 and 6 represent two embodiments of a receiver system capable of processing a MIMO transmission, determining the characteristics of the transmission channels (i.e., the SNR), and reporting full or partial CSI back to the transmitter system. Other designs based on the techniques presented herein and other receiver processing techniques can be contemplated and are within the scope of the invention.

The partial-CSI technique (e.g., CCMI and UMMSE techniques) may also be used in a straightforward manner without adaptive processing at the transmitter when only the overall received signal SNR or the attainable overall throughput estimated based on such SNR is feed back. In one implementation, a modulation format is determined based on the received SNR estimate or the estimated throughput, and the same modulation format is used for all transmission channels. This method may reduce the overall system throughput but may also greatly reduce the amount of information sent back over the reverse link.

Improvement in system performance may be realized with the use of the full/partial-CSI feedback techniques of the invention. The system throughput with partial CSI feedback can be computed and compared against the throughput with full CSI feedback. The system throughput can be defined as:

$$C = \sum_{i=1}^{N_C} \log_2(1 + \gamma_i),$$

where $\gamma_i$ is the SNR of each received modulation symbol for partial CSI techniques or the SNR of each transmission channel for the full CSI technique. The SNR for various processing techniques can be summarized as follows:

$$\gamma_i = \frac{1}{\sigma_n^2 \breve{r}_{ii}}, \text{ for the } CCMI \text{ technique}$$

$$\gamma_i = \frac{1}{u_{ii}}, \text{ for the } UMMSE \text{ technique, and}$$

$$\gamma_i = \frac{\lambda_{ii}}{\sigma_n^2}, \text{ for full } CSI \text{ technique.}$$

Figure 7A:
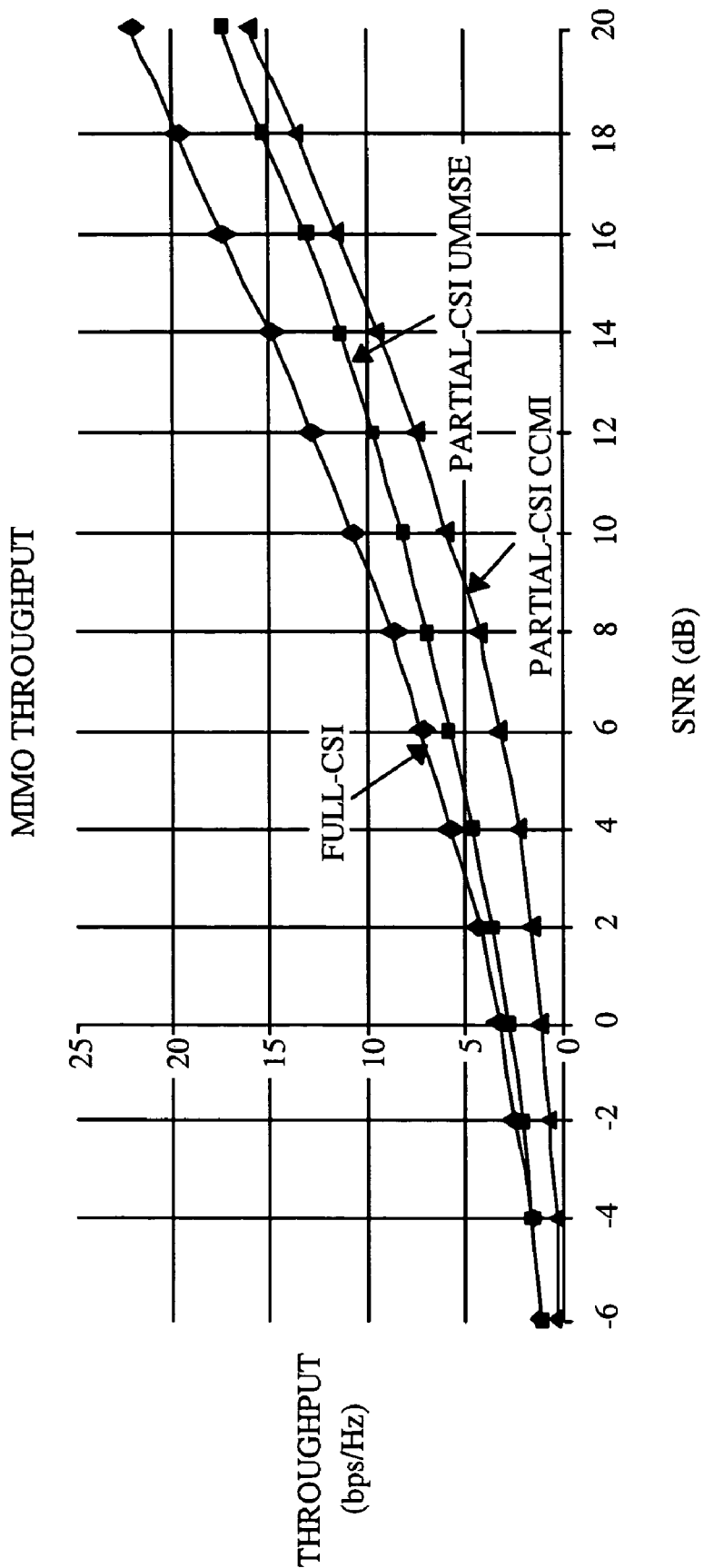
FIG. 7A shows the average throughput for the MIMO system for three receiver processing techniques and for different SNR values.
Figure 7B:
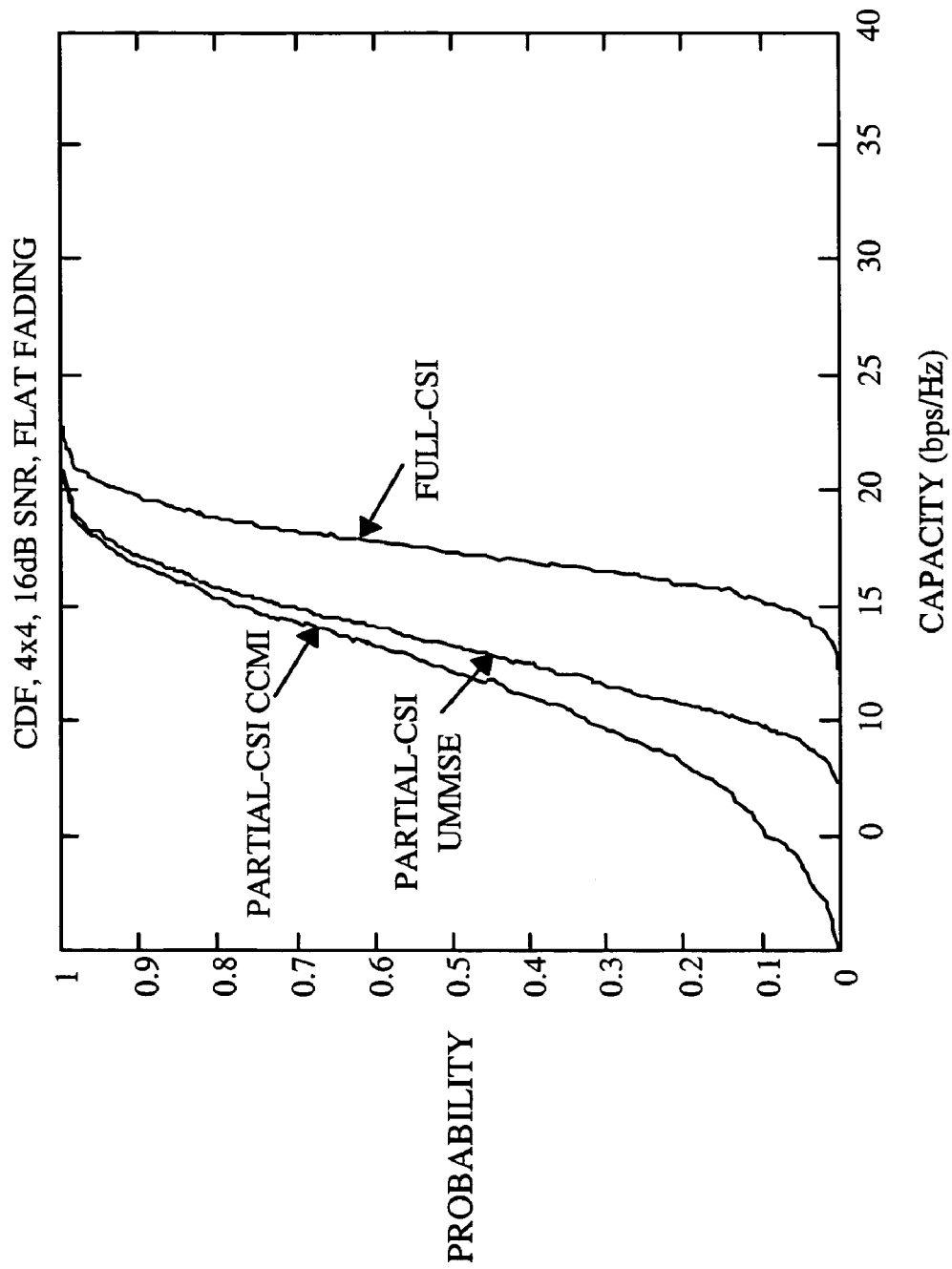
FIG. 7B shows the cumulative probability distribution functions (CDF) for the three receiver processing techniques generated based on the histogram of the data.

FIGS. 7A and 7B show the performance of a 4×4 MIMO system employing partial-CSI and full-CSI feedback techniques. The results are obtained from a computer simulation. In the simulation, the elements of each channel coefficient matrix H are modeled as independent Gaussian random variable with zero mean and unity variance. For each calculation, a number of random matrix realizations are generated and the throughput computed for the realization are averaged to generate the average throughput.

FIG. 7A shows the average throughput for the MIMO system for the full-CSI, partial-CSI CCMI, and partial-CSI UMMSE techniques for different SNR values. It can be seen from FIG. 7A that the throughput of the partial-CSI UMMSE technique is approximately 75% of the full-SI throughput at high SNR values, and approaches the full CSI throughput at low SNR values. The throughput of the partial-CSI CCMI technique is approximately 75%-90% of the throughput of the partial-CSI UMMSE technique at high SNR values, and is approximately less than 30% of the UMMSE throughput at low SNR values.

FIG. 7B shows the cumulative probability distribution functions (CDF) for the three techniques generated based on the histogram of the data. FIG. 7B shows that at an average SNR of 16 dB per transmission channel, there are approximately 5% cases when the throughput is less than 2 bps/Hz for the CCMI technique. On the other hand, the throughput of the UMMSE technique is above 7.5 bps/Hz for all cases at the same SNR. Thus, the UMMSE technique is likely to have lower outage probability than the CCMI technique.

The elements of the transmitter and receiver systems may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor.

Aspects of the invention may be implemented with a combination of software and hardware. For example, computations for the symbol estimates for the CCMI and UMMSE techniques and the derivation of the channel SNR may be performed based on program codes executed on a processor (controllers 530 and 650 in FIGS. 5 and 6, respectively).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data from a transmitter unit in a multiple-input multiple-output (MIMO) communication system, comprising:
    receiving channel state information (CSI) from a receiver unit;
    processing data for transmission to the receiver unit based on the received CSI, wherein the received CSI comprises signal-to-noise-plus-interference (SNR) estimates for each of a plurality of transmission channels, the processing at the transmitter unit including coding data for each transmission channel based on the SNR estimate for the transmission channel, and the data for each transmission channel is independently coded based on the SNR estimate for the transmission channel where the coding includes coding the data for the transmission channel with a fixed base code; and
    adjusting puncturing of coded bits based on the SNR estimate for the transmission channel.

2. The method of claim 1, wherein the processing at the transmitter unit further includes modulating coded data for each transmission channel in accordance with a modulation scheme selected based on the SNR estimate for the transmission channel.

3. The method of claim 1, wherein the reported CSI comprises characterizations for the plurality of transmission channels.

4. The method of claim 1, wherein the reported CSI is indicative of eigenmodes and eigenvalues for the plurality of transmission channels.

5. The method of claim 4, wherein the processing at the transmitter unit includes coding data for the transmission channels based on the eigenvalues.

6. The method of claim 5, wherein the data for each transmission channel is independently coded.

7. The method of claim 5, wherein the processing at the transmitter unit further includes modulating coded data for the transmission channels in accordance with modulation schemes selected based on the eigenvalues to provide modulation symbols.

8. The method of claim 7, wherein the processing at the transmitter unit further includes pre-conditioning the modulation symbols prior to transmission based on the eigenmodes.

9. The method of claim 1, wherein the MIMO transmitter implements orthogonal frequency division multiplexing (OFDM).

10. The method of claim 9, wherein the processing at the transmitter unit is performed for each of a plurality of frequency subchannels.

11. The method of claim 1, wherein the processing at the transmitter includes adjusting channel interleaving based on the SNR estimate for each transmission channel.

12. A multiple-input multiple-output (MIMO) transmitter comprising:
    at least one demodulator configured to receive and process one or more signals from a receiver unit to recover channel state information (CSI); and
    a transmit data processor configured to process data for transmission to the receiver unit based on the recovered CSI, wherein the recovered CSI comprises signal-to-noise-plus-interference (SNR) estimates for each of a plurality of transmission channels, the processing at the transmitter including coding data for each transmission channel based on the SNR estimate for the transmission channel, and the data for each transmission channel is independently coded based on the SNR estimate for the transmission channel where the coding includes coding the data for the transmission channel with a fixed base code, and further configured to adjust puncturing of coded bits is based on the SNR estimate for the transmission channel.

13. A multiple-input multiple-output (MIMO) transmitter comprising:
    means for receiving channel state information (CSI) from a receiver unit;
    means for processing data for transmission to the receiver unit based on the received CSI, wherein the received CSI comprises signal-to-noise-plus-interference (SNR) estimates for each of a plurality of transmission channels, the processing at the transmitter unit including coding data for each transmission channel based on the SNR estimate for the transmission channel, and the data for each transmission channel is independently coded based on the SNR estimate for the transmission channel where the coding includes coding the data for the transmission channel with a fixed base code; and
    means for adjusting puncturing of coded bits based on the SNR estimate for the transmission channel.

* * * * *